United States Patent
Itzinger

(10) Patent No.: US 9,321,381 B2
(45) Date of Patent: Apr. 26, 2016

(54) ARMREST DEVICE FOR A VEHICLE SEAT

(75) Inventor: Andreas Itzinger, Michelfeld (DE)

(73) Assignee: RECARO AIRCRAFT SEATING GMBH & CO. KG, Schwäbisch Hall (DE)

( * ) Notice: Subject to any disclaimer, the term of this patent is extended or adjusted under 35 U.S.C. 154(b) by 91 days.

(21) Appl. No.: 14/130,898

(22) PCT Filed: Jun. 1, 2012

(86) PCT No.: PCT/EP2012/002331
§ 371 (c)(1),
(2), (4) Date: Mar. 12, 2014

(87) PCT Pub. No.: WO2013/007332
PCT Pub. Date: Jan. 17, 2013

(65) Prior Publication Data
US 2014/0183923 A1    Jul. 3, 2014

(30) Foreign Application Priority Data

Jul. 9, 2011   (DE) .......................... 10 2011 107 044

(51) Int. Cl.
*B60N 2/46* (2006.01)
*B64D 11/06* (2006.01)

(52) U.S. Cl.
CPC ............ *B60N 2/4606* (2013.01); *B60N 2/4646* (2013.01); *B64D 11/06* (2013.01); *B64D 11/0646* (2014.12); *Y02T 50/46* (2013.01)

(58) Field of Classification Search
CPC .. B60N 2/4606; B60N 2/4626; B60N 2/4633; B60N 2/4646; B60N 2/4653; B64D 11/0644
USPC .................................. 297/411.32; 403/59, 61
See application file for complete search history.

(56) References Cited

U.S. PATENT DOCUMENTS

| | | | | |
|---|---|---|---|---|
| 1,836,321 A | * | 12/1931 | Graham | B60N 2/345 297/357 |
| 1,921,622 A | * | 8/1933 | Korth | B60N 2/34 16/364 |
| 4,322,111 A | * | 3/1982 | Barley | B60N 2/38 297/357 |
| 4,657,305 A | | 4/1987 | Meiller | |
| 4,848,840 A | * | 7/1989 | Toya | 297/411.32 |
| 5,984,416 A | * | 11/1999 | Waldo et al. | 297/411.38 |

(Continued)

FOREIGN PATENT DOCUMENTS

DE    3110515 A1    11/1982
DE    3529957 A1    3/1987

(Continued)

OTHER PUBLICATIONS

German Search Report mailed Jan. 9, 2012 in corresponding German Application No. DE102011107044.7 (with partial English Translation).

(Continued)

*Primary Examiner* — Patrick Maestri
(74) *Attorney, Agent, or Firm* — Posz Law Group, PLC

(57) ABSTRACT

An armrest device for a vehicle seat, in particular for a flight passenger seat, having an armrest that is connected to a seat component via a joint unit such that said armrest can be swiveled about a swivel axis. The armrest device comprises a locking unit for locking the joint unit, which has a bearing unit that is provided for the mobile mounting of the armrest.

11 Claims, 2 Drawing Sheets

(56) References Cited

U.S. PATENT DOCUMENTS

Figure 1:
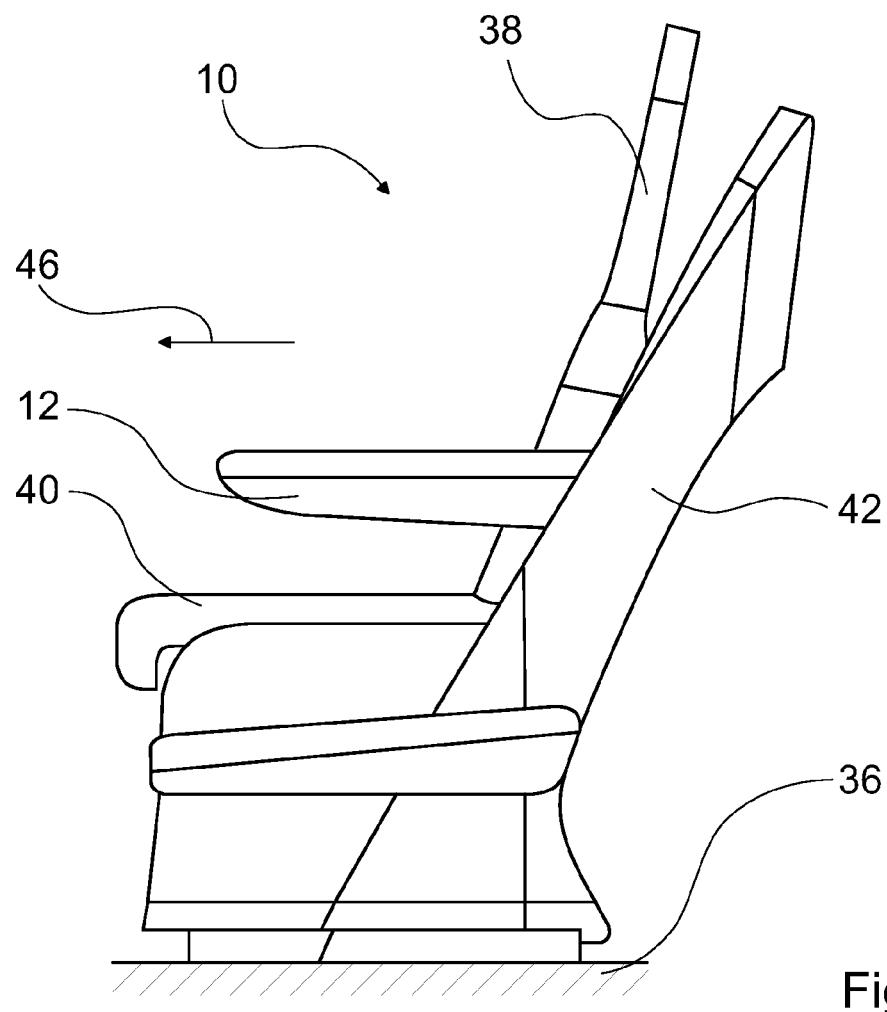

| | | | |
|---|---|---|---|
| 7,255,402 B1* | 8/2007 | Haddad et al. | 297/411.32 |
| 7,845,732 B2* | 12/2010 | Liu et al. | 297/411.38 |
| 8,132,861 B2* | 3/2012 | Cone | B60N 2/4646 |
| | | | 297/411.32 |
| 8,403,416 B2* | 3/2013 | Muck et al. | 297/411.32 |
| 8,449,029 B2* | 5/2013 | Runde | B60N 2/4613 |
| | | | 297/113 |
| 8,657,381 B2* | 2/2014 | Junige | 297/411.32 |
| 2009/0026826 A1* | 1/2009 | Cebula et al. | 297/411.32 |

FOREIGN PATENT DOCUMENTS

| | | |
|---|---|---|
| DE | 4007525 A1 | 9/1991 |
| DE | 9211290 U1 | 10/1992 |
| DE | 29517861 U1 | 1/1996 |
| FR | 2315241 A1 | 1/1977 |

OTHER PUBLICATIONS

International Search Report of the International Searching Authority mailed Nov. 9, 2012 for the corresponding international application No. PCT/EP2012/002331 (English translation).

International Preliminary Examination Report and Written Opinion mailed Jan. 14, 2014 in the the corresponding international application No. PCT/EP2012/002331 (English translation).

Written Opinion of the International Searching Authority mailed Jan. 9, 2014 in the the corresponding international application No. PCT/EP2012/002331 (English translation).

* cited by examiner

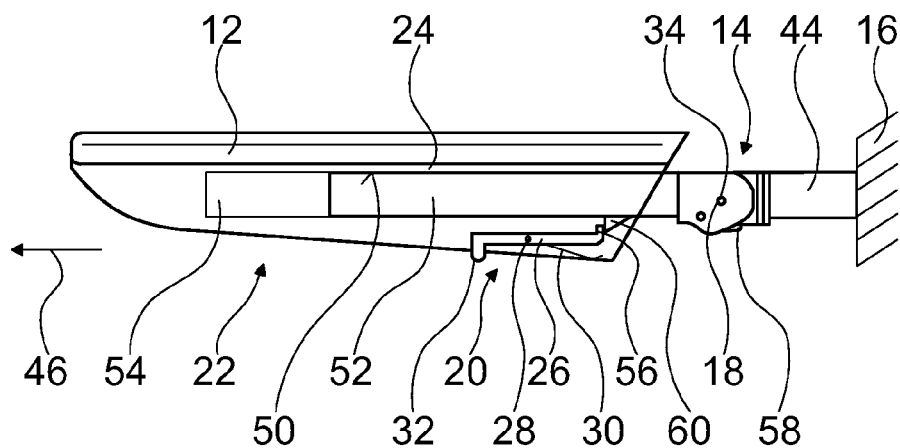
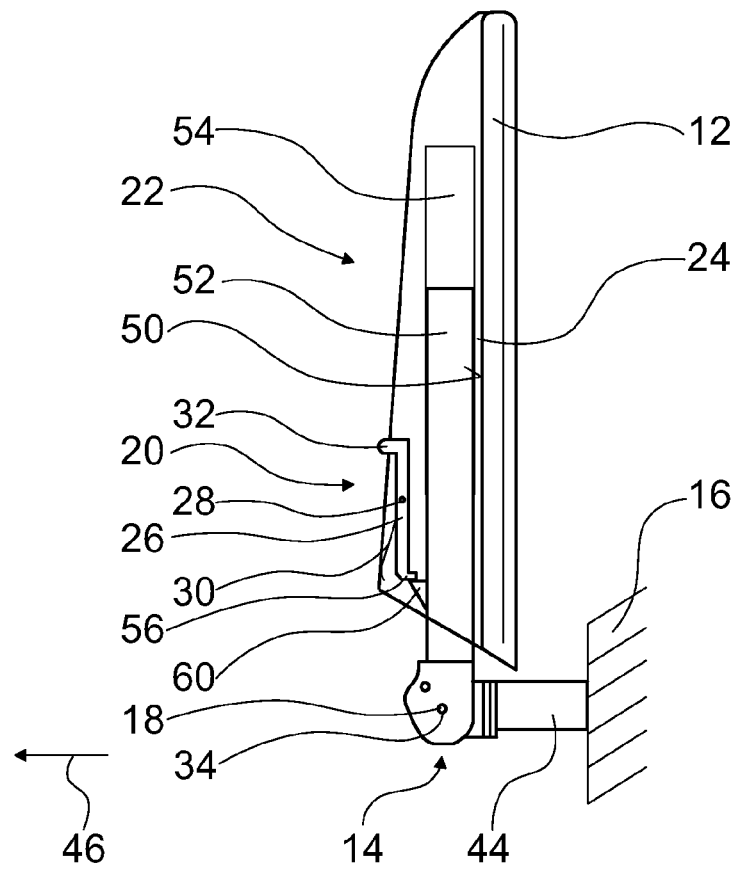

ARMREST DEVICE FOR A VEHICLE SEAT

CROSS REFERENCE TO RELATED APPLICATIONS

This application is a U.S. national stage application of International Patent Application No. PCT/EP2012/002331 filed on Jun. 1, 2012, and claims priority to, and incorporates by reference, German Patent Application No. 10 2011 107 044.7 filed on Jul. 9, 2011.

BACKGROUND

The invention relates to a mounting device for an armrest device in a vehicle seat.

An armrest device for a vehicle seat, in particular, for a flight passenger seat, having an armrest which is pivotably connected about a pivot axis to a seat component via a hinge unit, is already known. In some cases it is not desired or permitted for passengers to move an armrest positioned next to the aisle; as a result, the hinge unit is permanently locked. For a passenger who has limited mobility, however, such an arrangement makes access to the seat difficult or actually impossible.

Accordingly, it is a particular object of the invention to devise an armrest device with a compact and secure swing bearing for the armrest, which device can be easily locked and unlocked by a member of staff who has been instructed in its use.

This object is achieved by a seat mounting device according to the present invention. Additional advantageous realizations of the invention are described below.

ADVANTAGES OF THE INVENTION

The invention relates to an armrest device for a vehicle seat, in particular for a flight passenger seat, having an armrest which is pivotably connected around a pivot axis to a seat component via a hinge unit.

It is proposed that the armrest device be provided with a locking unit for locking the hinge unit, which locking unit has a bearing unit provided for the movable bearing of the armrest, whereby a particularly compact and secure pivot bearing of the armrest can be achieved. The term "armrest" in this context should be understood to mean in particular an armrest structure, which is provided to serve as a supporting surface for an arm of a user. The term "hinge unit" in this context should be understood to mean in particular a unit provided for mounting the arm so as to be pivotable relative to a seat component. The term "seat component" in this context should be understood to mean in particular a component part of a seat, such as, more particularly, a backrest, an enclosure for the backrest, and/or a seat frame. The term "locking unit" in this context should be understood to mean in particular a unit which selectively fixes the positions of at least two components relative to each other in at least one direction. In particular, the locking unit locks the hinge unit and thereby prevents the armrest from pivoting relative to the component part of the seat. The term "bearing unit" in this context should be understood to mean in particular a unit which bears at least two components such that they are movable with respect to each other.

In a further embodiment, it is proposed that the bearing unit comprise at least one linear guide element, provided for guiding the armrest translationally, relative to the seat component, whereby the hinge unit can be mechanically particularly easily locked and unlocked. In addition, the hinge unit can be advantageously concealed by the armrest on its surface by means of the linear guide element, when locked. The term "linear guide element" in this context should be understood to mean an element provided for guiding two component parts relative to each other in a linear movement. Advantageously, the linear guide element is provided for guiding the two component parts relative to each other in a purely linear movement.

It is further proposed that the at least one linear guide element be formed integrally with the armrest, whereby advantageously manufacturing costs and weight can be saved. The term "formed integrally" in this context should be understood to mean particularly firmly bonded, e.g. by welding and/or adhesive bonding, etc., and particularly advantageously formed in manufacture by, e.g., molding and/or in a single- or multi-component injection molding process.

It is further proposed that the locking unit comprises a blocking device, provided for preventing a translation of the armrest relative to the seat component in at least one operating state, whereby a particularly high level of operating safety can be achieved. The term "blocking device" in this context should be understood to mean in particular an element provided for preventing the actuation of the locking unit.

If the blocking device is mounted pivotably around a pivot axis, the blocking device may be formed to be particularly stable while at the same time having simple movement mechanics.

If the locking unit has a spring element provided for automatically moving the blocking element into a locking position, the operating safety can be further increased, and unintentional unlocking can be prevented. The term "spring element" in this context should be understood to mean a spring-biased element which has at least one extension that, in a normal operating state, can be elastically changed by at least 10%, in particular by at least 20%, preferably by at least 30%, and particularly advantageously by at least 50%, and which, in particular, generates a counterforce that depends on the change in the extension and preferably is proportional to the change, which counterforce resists the said change.

In a further embodiment of the invention, it is proposed that the locking unit comprises an actuating element provided for deflecting the blocking element from its locking position, whereby a particularly high degree of user-friendliness can be achieved. The term "actuating element" in this context should be understood to mean in particular an element which is provided for actuation by a user in order to change the locking state of the locking unit. Preferably the actuating element comprises a pushbutton.

It is further proposed that the armrest is pivotable by at least 90°, whereby a particularly large unimpeded passage region can be achieved. The term "passage region" in this context should be understood to mean in particular a region provided for facilitating passage from a cabin aisle to a flight passenger seat.

The user-friendliness can be further increased in a simple manner if the hinge unit comprises a friction-locking element designed to hold the armrest in a defined position by means of its clamping torque.

DRAWINGS

Additional advantages will be apparent in the following description of the drawings, which illustrate an exemplary embodiment of the invention. The Description and the Claims contain numerous features in combination. A technical expert will appreciate the features individually and will be able to combine them in additional useful combinations.

Figure 2:
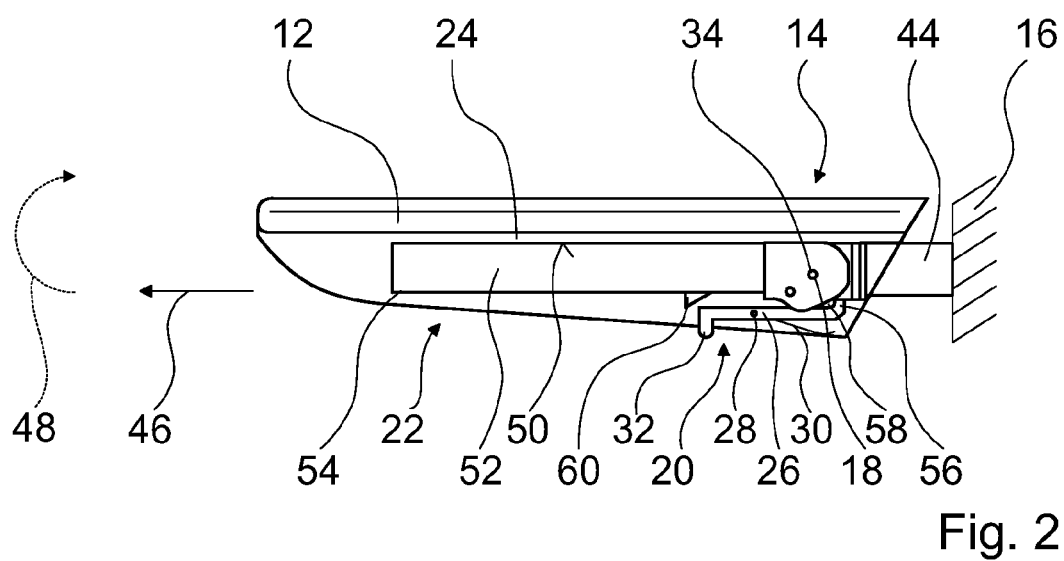

The drawings depict:

FIG. 1 a lateral view of a flight passenger seat with an armrest device according to the invention;

FIG. 2 a lateral view of the armrest device in a locked state;

FIG. 3 a lateral view of the armrest device in an unlocked state; and

FIG. 4 a lateral view of the armrest device in an open state.

DESCRIPTION OF THE EXEMPLARY EMBODIMENT

FIG. 1 depicts a vehicle seat in the form of a flight passenger seat 10. An armrest device with an armrest 12, which serves as an armrest structure for a passenger, is positioned on the flight passenger seat 10. The armrest 12 also partly delimits a seating area from a cabin aisle and partly blocks a passage region arranged between the seating area and the cabin aisle. The flight passenger seat 10 is mounted on the cabin floor 36. The flight passenger seat 10 has a backrest 38 which is mounted on a seat base 40 so as to be pivotable and which can be moved to the rear to an extent in a bowl-shaped enclosure 42 which is arranged on the flight passenger seat 10.

FIG. 2 depicts a detailed view of the armrest device. For the sake of clarity, one side wall of the armrest 12 is not depicted, rendering a mechanical arrangement positioned in the interior of the armrest 12 visible. The armrest 12 is connected to a seat component 16 via a hinge unit 14, such that the armrest is pivotable around a pivot axis 18. The seat component 16 in the embodiment depicted is formed by the enclosure 42. In this context, however, it is conceivable for the seat component 16 to be formed by the backrest 38, the seat base 40, or a seat frame of the flight passenger seat 10. The hinge unit 14 is connected to the seat component 16 via a flat connecting element 44, positioned between the enclosure 42 and the backrest 38. The connecting element 44 maintains a separation between the hinge unit 14 and the enclosure 42, and hence the gap between the backrest 38 and the enclosure is particularly small. The risk of injury to a passenger by catching parts of the body between the enclosure 42 and the backrest when pivoting the armrest 12 can thus be minimized.

The armrest device comprises a locking unit 20 with a bearing unit 22, which provides movable bearing for the armrest 12. The bearing unit 22 has a linear guide element 24, which guides the armrest 12 transversely relative to the seat component 16. The armrest 12 is thus moved relative to the seat component 16, parallel to the seating direction 46. The movement of the armrest 12 relative to the seat component 16 results in a change in the state of the locking unit 20. A movement of the armrest 12 in the seating direction 46, i.e. away from the seat component 16, brings the locking unit 20 to an unlocked state. In its unlocked state, the locking unit 20 is inoperative. In the unlocked state, the armrest 12 can be pivoted around the pivot axis 18. Moving the armrest 12 in the direction opposite to the seating direction 46, i.e. toward the seat component 16, brings the locking unit to a locked state. In its locked state, the locking unit 20 is operative. The armrest 12 cannot be pivoted around the pivot axis 18 when the unit is in the locked state.

In a normal sitting posture with legs parallel, the seating direction 46 corresponds to the direction of the extension of the upper leg of the passenger, from the buttocks to the region of the knee. The seating direction 46, in particular, is aligned perpendicular to a backrest surface formed by the backrest 38 in an upright position and in a direction away from the backrest surface. A forward edge of the seat base 40 is aligned perpendicular to the seating direction 46 and parallel to the cabin floor 36, on which the flight passenger seat 10 is positioned. In this context, however, it is also conceivable for the armrest 12 to be mounted otherwise, so that, in particular, a movement transverse to the seating direction 46 and/or a rotational movement in a rotational direction 48 brings the locking unit 20 to a change in state. The linear guide element 24 is formed integrally with the armrest 12, and has a flat sliding surface 50, against which a guide rail 52 of the bearing unit 22 rests. The guide rail 52 is inserted into a guide channel 54 in the armrest 12.

In order to prevent an unintentional or unauthorized displacement of the armrest 12, the locking unit 20 has a blocking element 26 which prevents the actuation of the locking unit 20 when in a locking position, i.e. in a locked state. The blocking element 26 is formed from an elongated metal piece, and is arranged inside the armrest 12. An actuating element 32 in the form of a pushbutton, which projects out of the armrest 12 on the underside thereof, is located at one end of the blocking element 26. The blocking element 26 is mounted on the armrest 12 so as to be pivotable around a pivot axis 28. A detent 56 is formed at one free end of the blocking element 26, opposite to the actuating element 32, which, in the locked state, engages behind a locking element 58, which is firmly connected to the connecting element 44. In the locked state, the armrest 12 is thus connected to the connecting element 44 via the blocking element 26.

In addition, the locking unit 20 has a spring element 30 which independently moves the blocking element 26 into the locking position. The spring element 30 is designed in the form of a leaf spring. In this context, however, utilizing other spring elements, which a technical expert may find useful, such as helical, torsion, disk, and/or pneumatic springs, is also conceivable. The spring element 30 is mounted on the blocking element 26 and its free end rests against a lower outer wall of the armrest. The spring element 30 presses the detent 56 against the locking element 58 and against the connecting element 44. Pressing the pushbutton 32 acts against the spring force of the spring element 30.

FIGS. 3 and 4 depict a pivoting movement of the armrest 12. In a first step, the actuating element 32 is pressed in the direction of the armrest 12. This causes the blocking element 26 to pivot around the pivot axis 28 and further compresses the spring element 30. The detent 56 moves away from the connecting element 44, whereby the blocking element 26 is disengaged from the locking element 58 and is released. In a second step, the armrest 12 is moved transversely in the seating direction 46, out of its initial position (FIG. 3). In the process, the armrest 12 is guided by the bearing unit 22. Following this movement, the armrest 12 no longer rests against the hinge unit 14, and the hinge unit 14 is released. In order to prevent the armrest 12 inadvertently being pushed back into its initial position, a second, barb-shaped locking element 60 is positioned on the armrest 12, over which locking element 60 the detent 56 slides. When the armrest 12 reaches its end position, i.e. When the armrest 12 cannot advance further, the detent 56, viewed in the seating direction 46, catches behind the second locking element 60, whereby the armrest 12 is prevented from being pushed back into its initial position.

In a final step, the armrest 12 is pivoted 90° around the pivot axis 18, away from its normal position and over the released hinge unit 14, and finally into a vertical position with respect to the seat base 40. In this process, the free end of the armrest is moved away from the seat base 40. The hinge unit 14 comprises a friction-locking element 34 which is positioned coaxially to the pivot axis 18. The friction-locking element 34 is formed by a screw. By means of its clamping torque, the friction-locking element 34, around which the armrest 12 pivots, generates friction between the connecting element 44 and the armrest 12, thereby preventing the armrest 12 from falling back from its raised position. The armrest 12 is thus held in a defined position by the clamping torque.

In order to bring the armrest 12 back into its initial position, the armrest 12 is first pivoted back to its normal position. The blocking element 26 is then released from the second locking element 60 by pressing the actuating element 32. The armrest 12 is now moved back into its initial position in the direction opposite to the seating direction 46. The hinge unit 14 is thus reengaged with the armrest 12, and is positioned inside the guide channel 54 where it cannot be seen by the user.

REFERENCE NUMERALS

- 10 Flight passenger seat
- 12 Armrest
- 14 Hinge unit
- 16 Seat component
- 18 Pivot axis
- 20 Locking unit
- 22 Bearing unit
- 24 Linear guide element
- 26 Blocking element
- 28 Pivot axis
- 30 Spring element
- 32 Actuating element
- 34 Friction-locking element
- 36 Cabin floor
- 38 Backrest
- 40 Seat base
- 42 Enclosure
- 44 Connecting element
- 46 Seating direction
- 48 Rotational direction
- 50 Sliding surface
- 52 Guide rail
- 54 Guide channel
- 56 Detent
- 58 Locking element
- 60 Locking element

The invention claimed is:

1. An armrest device fix a vehicle seat, comprising:
   an armrest pivotally connected around a pivot axis to a seat component via a hinge unit; and
   a locking unit locking the hinge unit in a locked state, and in the locked state the locking unit prevents the armrest from pivoting relative to the seat component, the locking unit has a bearing unit and the bearing unit includes a linear guide element configured to guide the armrest transversely relative to the seat component wherein the armrest is configured to change a state of the locking unit between the locked state and an unlocked state by movement of the armrest relative to the seat component.

2. The armrest device according to claim 1, wherein the linear guide element is formed integrally with the armrest.

3. The armrest device according to claim 1, wherein the locking unit comprises a blocking element configured to prevent transverse movement of the armrest relative to the seat component in an operating state of the armrest.

4. The armrest device according to claim 3, wherein the blocking element is mounted pivotably around another pivot axis.

5. The armrest device according to claim 3, wherein the locking unit has a spring element configured to automatically move the blocking element into a locking position.

6. The armrest device according to claim 3, wherein the locking unit comprises an actuating element configured to deflect the blocking element from a locking position.

7. The armrest device according to claim 1, wherein the armrest can be pivoted at least 90° from a horizontal position to a vertical position.

8. The armrest device according claim 1, wherein the hinge unit comprises a friction-locking element configured to hold the armrest in a predetermined position.

9. A system with an armrest device according to claim 1 and with a flight passenger seat.

10. An armrest device according to claim 1, wherein movement of the armrest away from the seat component brings the locking unit into the unlocked state.

11. An armrest device according to claim 1, wherein movement of die armrest toward the seat component brings the locking unit into the locked state.

* * * * *